March 4, 1958 J. P. ECKERT, JR., ET AL 2,825,869

BI-TOROIDAL TRANSVERSE MAGNETIC AMPLIFIER WITH CORE STRUCTURE PROVIDING HIGHEST SYMMETRY AND A CLOSED MAGNETIC PATH

Filed April 7, 1955

INVENTORS
JOHN PRESPER ECKERT, JR.
DANIEL M. LIPKIN
BY
Charles C. English
AGENT

Patented Mar. 4, 1958

2,825,869

BI-TOROIDAL TRANSVERSE MAGNETIC AMPLIFIER WITH CORE STRUCTURE PROVIDING HIGHEST SYMMETRY AND A CLOSED MAGNETIC PATH

John Presper Eckert, Jr., and Daniel M. Lipkin, Philadelphia, Pa., assignors, by mesne assignments, to Sperry Rand Corporation, New York, N. Y., a corporation of Delaware Application April 7, 1955, Serial No. 499,924

8 Claims. (Cl. 323—89)

The present invention relates to saturable reactors with transverse magnetization and more particularly to means for utilizing such reactors to accomplish certain useful purposes in a novel and unexpected manner. Magnetic devices, generally have found application in all of the arts utilizing electrical phenomena. Of particular interest here, are those magnetic devices useful for the amplification and control of electric signals. It is in this field that the present invention finds particular application.

The present invention concerns and comprises bi-toroidal ferro-magnetic amplifier structure having a toroidal shell of ferro-magnetic material with a winding threading the inside of the shell, a second winding around the shell positioned transversely with respect to the first winding and the simultaneous application of power to the two windings of such value that the oscillating resultant magnetic field is larger than required for saturation, carries the core material into the region of vanishing rotational hysteresis loss and exerts a clamping action on the resultant magnetic flux causing it to oscillate and thereby cut one of the transverse windings and induce a signal therein.

The inter-action of transversely disposed magnetic fields in ferro-magnetic materials is a subject which has not been explored experimentally with the same degree of completeness as have other aspects of ferromagnetism. There exists a paucity of detailed phenomenological models of what happens when mutually perpendicular magnetic fields are simultaneously impressed on a ferromagnetic medium. Consequently, attempts to give an explanation of the magnetic basis even of practical devices which employed transverse magnetization seem generally to be limited to a vague reference to "magnetic energy" or to the qualitatively satisfying but quantitatively unspecific description that "one of the transverse magnetic fields saturates a portion of the material included in the path of the other magnetic field, thus increasing the reluctance of magnetic circuit of said second field."

It is accepted magnetic field theory that two magnetic fields do not interact energetically unless the magnetic intensity associated with one field can influence the induction associated with the other magnetic field. Specifically such a lack of energetic interaction holds quite generally for mutually perpendicular magnetic fields in ordinary non-ferrous magnetic materials.

In the present invention, a novel structure and method of operation is disclosed whereby improved operation of magnetic devices having transverse field can be obtained. In the present invention, transversely-acting magnetic fields each seize upon and effect substantially the entire body of the magnetized material in the core structures. It is accordingly a purpose of the present invention to show how certain well known empirical facts concerning ferro-magnetism can be applied to provide a basis not only for the construction of useful electro-magnetic elements but can also provide a detailed phenomenological description of the operation of these devices even down to the intimate level of small localities macroscopic in the ferromagnetic medium.

Magnetic hysteresis, which ordinarily accompanies the use of saturable reactors, prevents the magnetic induction in a reactor from being a single valued function of the magnetic intensity in the reactor. This ordinarily gives rise to an irreversible loss of energy from the electrical circuits coupled to the reactor.

A first object of the invention is therefore to provide an inductor based on a magnetizable structure having means for applying magnetic fields in orthogonal directions therein whereby the inductor will exhibit substantially less hysteresis and hysteresis-energy-loss than a comparable ordinary inductor based on the same magnetic-core material and operated at the same magnetic flux density.

It is another object of the invention to provide novel means whereby the current existing in an electrical circuit electrically controls the coupling of energy to that circuit or to any other circuit operating through the medium of a transversely magnetizable structure.

It is a further object of the invention to provide novel means for selectively controlling electrical energy to provide a structure for the modulation or amplification of electric signals.

It is a further object of the invention to provide an amplifier having an improved signal-to-noise ratio.

In the drawings, like numerals refer to like parts throughout.

Figure 2:
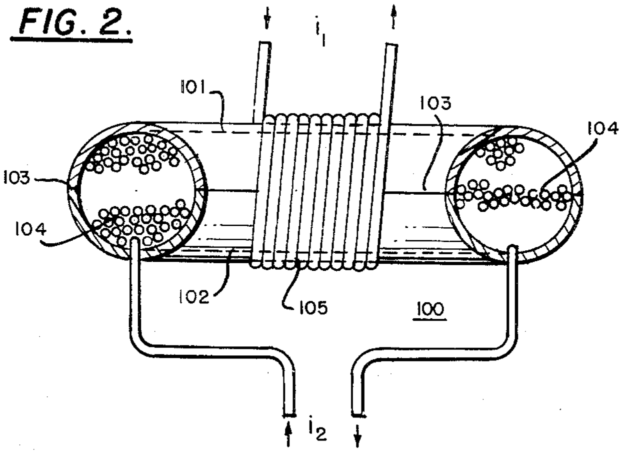
Figure 2 is an elevation in section of one form of a basic element of the invention.

Reference is made to the copending applications Serial No. 402,858 of Bonn and Torrey, filed January 8, 1954, for "Signal Translating Device," and Serial No. 382,180, of Eckert and Bonn, filed September 24, 1953, for "Signal Translating Device," for a discussion of the ferro-magnetic material preferably employed in the present core structure. Reference is also made to the copending application Serial Number 494,903 of Daniel M. Lipkin for "Transverse Magnetic Amplifier," filed on March 17, 1955, for background pertinent to the subject matter of transverse magnetization. All these three copending applications are assigned to the same assignee as the present application. The book "High-Speed Computing Devices" by Thompkins, Wakeline and Stiffler, published in 1950 by McGraw-Hill, will be found to describe uses to which one may put the invention.

For the purposes of discussion herein, a varying direct current or a direct current of fixed value with a superimposed alternating current component, are regarded as equivalent. Whether these currents are built up by combining a battery and A. C. generator or are derived from what may be thought of as a "single" source, i. e. a network, is immaterial. Such a "single" source would be regarded as an equivalent of a battery plus an oscillator or generator. In the present discussion and in subsequent related applications the term alternating current, A. C., will include all types of variable currents and is not to be limited to a sine wave unless so stated in a particular instance.

The basic considerations concerning transverse devices comprising the present invention may be formulated as follows:

(1) Transverse fields are in general applied to a core of ferromagnetic material simultaneously. It may be noted that the B–H relationships are quantitatively unknown except under the conditions to be described below.

(2) It is possible by means of the invention to obtain quantitatively predictable B–H relationships in transverse core structures, consisting in the resultant B vector being a simple mathematical function of the resultant H vector.

(3) The above is accomplished by observing strictly the condition that the scalar magnitude of the vector resultant magnetizing force be kept above a predeterminable level characteristic of the magnetic material.

A. When the above condition is met, the vector flux density B is substantially given by the vector equation:

$$(1) \qquad \vec{B}=\frac{Bs\vec{H}}{h}$$

where $Bs$ is the saturation flux density magnitude for the material; $\vec{H}$ is the resultant magnetizing force vector in the material; and $h$ is the scalar magnitude of $\vec{H}$. The above equation states that $\vec{B}$ is in the same direction as $\vec{H}$ and has the fixed magnitude $Bs$. This relationship is justified and occurs when the above condition is satisfied.

B. When Equation 1 is satisfied, the core itself does not absorb or store energy even temporarily, but merely serves to transfer energy between the sources of the transverse fields, yielding loss-less operation.

(4) Condition 3 above is met by having at least two transverse fields satisfying the condition:

$$(2) \qquad h \geqslant hp$$

where $hp$ is the predeterminable level referred to in 3 above.

(5) In a practical embodiment, a transverse magnetic structure, constructed in accordance with the foregoing considerations, would comprise a body of magnetic material having magnetizing means associated therewith and adapted to impress mutually orthogonal fields on the said body. An output effect may be produced from such a transverse structure by varying the magnitude of at least one of the transverse fields and, so long as the condition represented by Equation 2 is satisfied, the operation of the device will be substantially loss-less.

(6) The predeterminable level $hp$ referred to above may be taken to be that value of magnetizing field larger than the value at which the specific rotational hysteresis loss for the material peaks (see Figure 1) and for which the specific rotational hysteresis loss is appreciably less than said maximum rotational hysteresis loss.

Figures 1, 3:
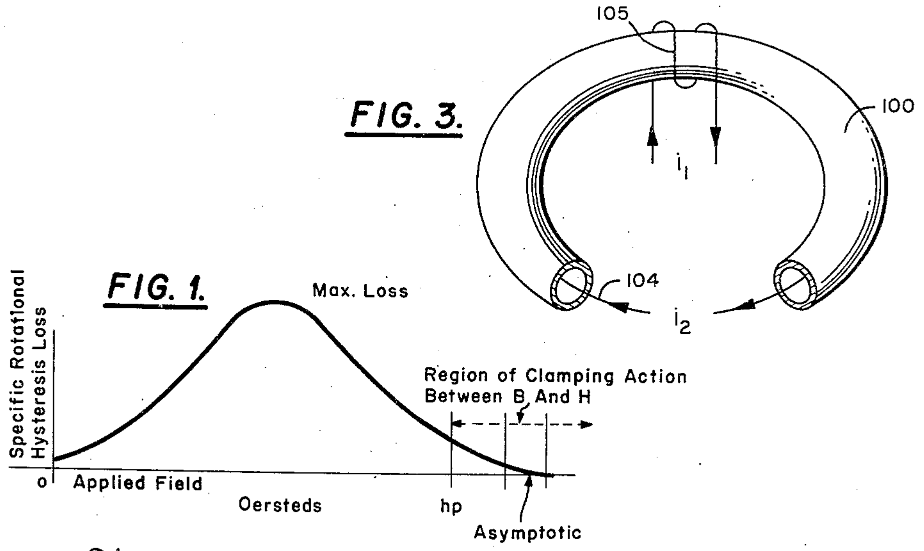
Figure 1 is a hysteresis loss diagram.
Figure 3 is a sectional perspective view of Figure 1.

As shown in Figure 1, the hysteresis loss in a magnetic material increases to a maximum and, as the resultant magnetic field continues to increase beyond saturation, the region of vanishing rotational hysteresis loss is reached and changes of magnetization of the core will take place without storage or irreversible loss of energy in the core or shell. Just where the region of substantially diminishing rotational loss occurs will vary greatly as the characteristic hysteresis loop departs from a rectangle which gives the steepest slope for the curve of Figure 1. This curve is not necessarily symmetrical, but starts near the origin, passes through a more or less critical maximum and is asymptotic to the "X" axis as field H increases. The region we are here concerned with lies to the right of this maximum and is believed to include nearly the entire region to the right of saturation for cores having highly rectangular loops.

It will be seen from the above that the mutual inductance is not the result of a single field, but is produced by the competition of two orthogonal fields each of which tries to align the saturated induction vector in its own direction.

In Figures 2 and 3, a toroidal shell 100 of suitable magnetic material is made in two halves 101 and 102, separated by a parting line 103 which is highly polished so that the mating surfaces are plane to within a few microinches. A surface of this character yields substantially the same magnetic characteristics as an integral shell and is not difficult or expensive to produce with techniques now available.

Coil 104 is preformed and inserted in the lower half 102 of shell 100 after which upper half 101 is put in place and winding 105 wound around the assembled shell 100 as shown. Winding 105 is provided with as many turns as the design function of the particular piece of apparatus may require, depending upon just where the saturable reactors with transverse magnetization properties is employed, usually it completely covers shell 100.

At any given point in shell 100, the acting field will be the resultant of existing fields produced by the windings 104 and 105 which are energized simultaneously. The result obtained depends upon the currents flowing in the two windings at the same time.

If now coil 104 carries a direct current, which may be called a biasing current, of sufficient magnitude to fully saturate the core material and carry it out on the curve of Figure 1 into the region of effective clamping action, the application of a transverse field will not produce hysteresis loss, and changes of magnetization will take place without any storage or irreversible loss of energy in the core or shell 100. Since the core material is in a state of virtual scalar saturation, the resultant induction vector will have substantially constant magnitude. Under these conditions the application of a variable or A. C. current to winding 105 produces a motion of the resultant magnetic field vector which causes corresponding movement of the magnetic induction vector. As the induction vector is thus caused to vary in direction, its orthogonal components threading the various core windings also vary, and this variation of flux-density affecting the coils wound on the core accounts for all output effects.

It is the constant alignment in direction between the magnetizing-field and induction vectors, produced by the maintained large scalar magnitude of the magnetizing field vector, which is referred to as "effective clamping action."

Figure 4:
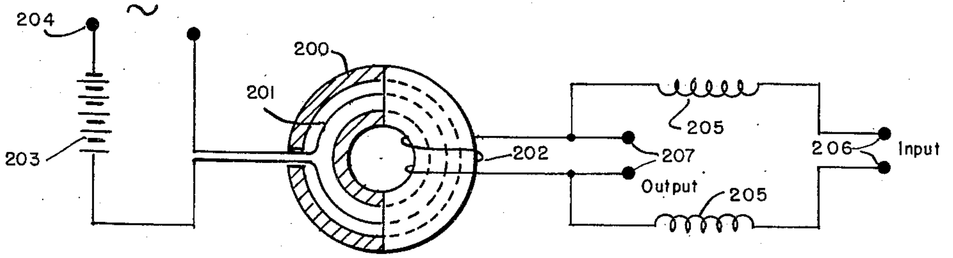
Figure 4 is a schematic circuit diagram of one form of the invention.

If now we refer to Figure 4, there will be seen a ferromagnetic core 200 having an inner winding 201 corresponding to coil 104, and an outer winding 202 corresponding to coil 105. Inner winding 201 is connected to a battery or other D. C. source 203 on which is superimposed an A. C. source 204. Winding 202 is connected in series with two large choke coils 205 which will prevent the flow of any alternating current in coil 202 at the frequency of source 204.

A direct current is now applied to terminals 206 of winding 202 of a value capable of producing the same order of magnitude of magnetizing field as the D. C. component in coil 201 from battery 203. It will be seen that the two transverse fields combine to produce a resultant magnetizing field vector whose scalar magnitude will periodically vary, and whose direction will oscillate through a moderate angle. This action will be seen to rock the induction vector back and forth through the same angle. The oscillation in direction of the induction vector induces an A. C. voltage in orthogonal winding 202 which will be available at terminals 207.

Thus, it will be seen that the structure of Figure 4 may comprise a device with two modes of operation, one mode being a zero voltage at terminals 207 and the second mode being an A. C. signal at the terminals produced by the aforesaid oscillation. Again, the structure of Figure 4 lends itself to use as a magnetic amplifier in which an output signal is produced only in response to an input signal. The structure, as may be seen, provides a closed magnetic path for both of the transverse components of the magnetic field with the highest obtainable symmetry.

While there has been described above what are at present believed to be the preferred forms of the invention, the appended claims are intended to include all variations thereof which fall within the true spirit of the invention.

We claim:

1. A bi-toroidal transverse magnetic amplifier comprising a hollow toroid of ferro-magnetic material providing a closed magnetic path of high symmetry for two transverse components of the magnetic field, a first winding threading said toroid, a second winding wound around said toroid and positioned substantially transversely to said first winding, means for applying a variable current to one of said windings and means to apply simultaneously a signal current to the other one of said windings, said currents being of such value that they maintain the ferro-magnetic material in the region of constant alignment between the resultant magnetic field vector and the resultant induction vector and of vanishing rotational hysteresis loss.

2. The combination set forth in claim 1, said toroid being cut to provide circular inside channels to receive said winding threading said toroid, the mating surfaces of said toroid being polished to maximize field symmetry.

3. The combination set forth in claim 1, said variable current having a D. C. component and an R. F. component.

4. The combination set forth in claim 3, said components of said variable current being of such value that they maintain the ferro-magnetic material in the region of potential vanishing hysteresis loss.

5. The combination set forth in claim 3, said winding carrying said signal current having a choke coil connected thereto for suppressing current flow of the frequency of said variable current.

6. A bi-toroidal transverse magnetic amplifier comprising a hollow toroid of ferro-magnetic material providing a closed magnetic path of high symmetry for two transverse components of the magnetic field, a first winding threading said toroid, a second winding wound around said toroid and positioned substantially transversely to said first winding, means for applying a variable current with a D. C. and an R. F. component to one of said windings and means to apply simultaneously a signal current to the other one of said windings, said currents being of such value that they maintain the ferro-magnetic material in the region of constant alignment between the resultant magnetic field vector and the resultant induction vector.

7. The combination set forth in claim 6, said winding carrying said signal current having signal input and signal output terminals and a choke coil connected therebetween for suppressing current flow corresponding to said R. F. component.

8. The combination set forth in claim 6, said toroid being cut to provide circular inside channels to receive said winding threading said toroid, the mating surfaces of said toroid being polished to maximize field symmetry.

References Cited in the file of this patent

UNITED STATES PATENTS

| | | |
|---|---|---|
| 2,574,438 | Rossi et al. | Nov. 6, 1951 |

OTHER REFERENCES

Publication—"Nondestructive Sensing of Magnetic Cores" by D. A. Buck and W. I. Frank, Communication and Electronics, pp. 822–830, January 1954.